Nov. 15, 1966   D. J. CLARKE   3,284,881
BLADED STATORS
Filed April 16, 1963   2 Sheets-Sheet 1
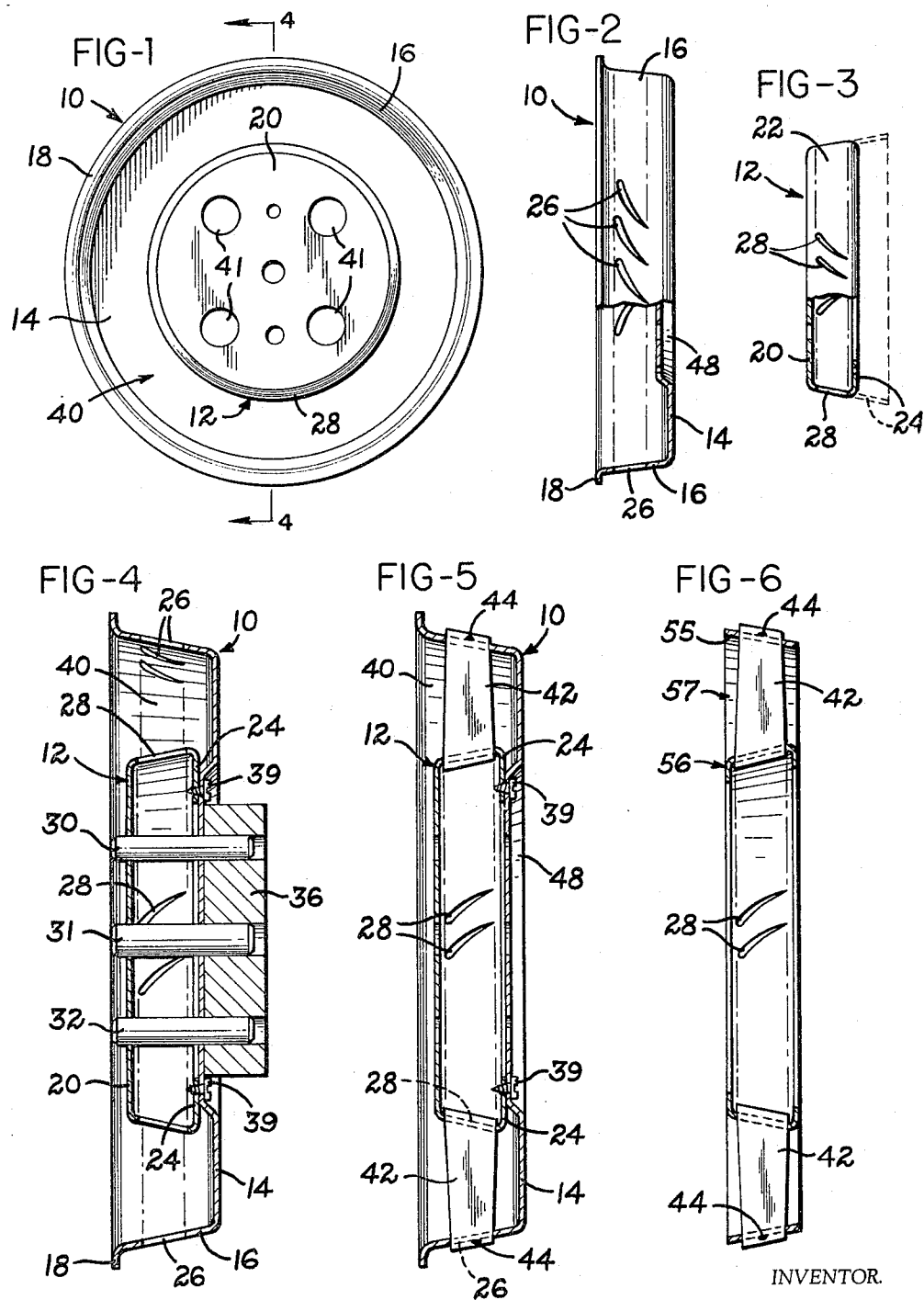
INVENTOR.
DANIEL J. CLARKE
BY
Marechal, Biebel, French & Bugg
ATTORNEYS Nov. 15, 1966 D. J. CLARKE 3,284,881
BLADED STATORS
Filed April 16, 1963 2 Sheets-Sheet 2
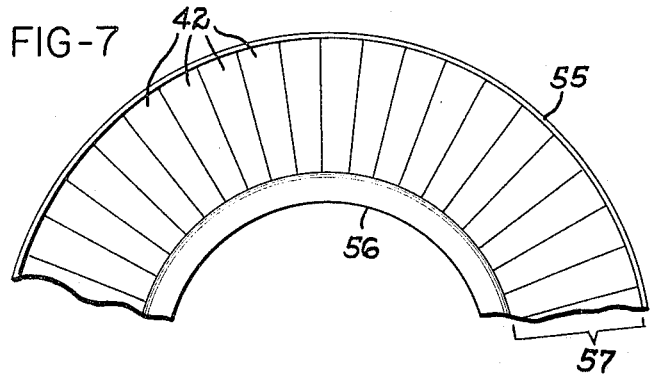
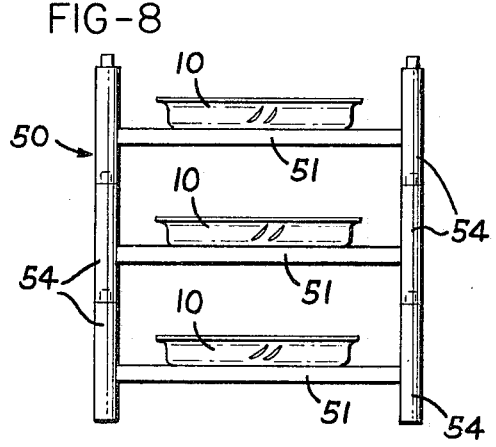
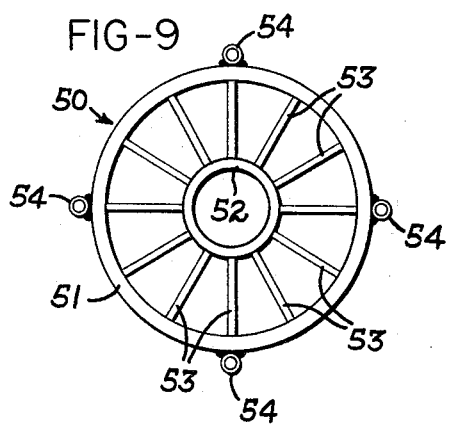
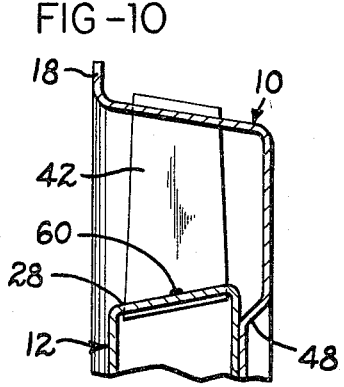
INVENTOR.
DANIEL J. CLARKE
BY
*Marechal, Biebel, French & Bugg*
ATTORNEYS

United States Patent Office 3,284,881
Patented Nov. 15, 1966

3,284,881
BLADED STATORS
Daniel J. Clarke, Bay City, Mich., assignor to The Stalker Corporation, Essexville, Mich., a corporation of Michigan
Filed Apr. 16, 1963, Ser. No. 273,455
12 Claims. (Cl. 29—156.8)

This invention relates to a process and apparatus for making bladed stators for fluid flow machines, particularly turbines, compressors and the like.

An object of this invention is to provide an economical method or process for fabricating bladed stators requiring the components to be bonded together.

Another object is to provide an economical method for fabricating bladed stators wherein the components are bonded by brazing and are held in proper relation by parts of the components themselves.

A further object of this invention is to provide a combined stator vane assembly and brazing fixture for the furnace bonding of a bladed stator without the use of supplementary jigs in the furnace for positioning the vanes in the shrouds.

Another object of this invention is the provision of a stator vane assembly wherein cup or pan members are provided for the positioning of the stator vanes, and wherein the bottoms of the outer pans are thereafter removed leaving the rims in place as the stator shrouds.

A bladed stator assembly for a compressor for instance commonly comprises an inner ring having radially extending flanges defining a channel cross section, an outer ring of smaller diameter, and peripherally spaced blades in the annular space between the two rings with the blades fixed at opposite ends to the adjacent rings.

The rings and blades must be accurately fixed relative to each other, and since they are very flexible and fragile, a fixture must be employed to position the parts while they are being bonded together, as by brazing in a furnace for instance. These fixtures are expensive to produce, costly to recondition after one or more passes through a high temperature furnace, and so bulky that they reduce the capacity of the furnace.

In the process of this invention, the parts and steps are devised to eliminate such fixtures, greatly reducing the cost of production. Preliminary forms of at least some of the components are such that they position each other and provide a strong stable assembly which can retain the prescribed dimensions for the finished stator without reliance on additional or external positioning fixtures.

Other objects and advantages of the invention will be apparent from the following description, the accompanying drawings, and the appended claims.

In the drawings—

FIG. 1 is an axial view of the pan assembly of this invention;

FIG. 2 is a side elevation, partially broken away, of the outer pan;

FIG. 3 is a side elevation, partially broken away, of the inner pan;

FIG. 4 is a section through the pan assembly prior to the insertion of the vanes, taken generally along the lines 4—4 of FIG. 1, showing the assembly on the locating fixture;

FIG. 5 is a view similar to FIG. 4 showing the assembly with the locating fixture removed and with two of the vanes in position;

FIG. 6 is a view similar to FIG. 5 showing the finished stator assembly after brazing and machining and with the bottom portions of the pan removed;

FIG. 7 is a fragmentary axial view of the finished stator assembly of FIG. 6;

FIG. 8 is a side view of several of the brazing racks, stacked one on the other;

FIG. 9 is a plan view of one of the brazing racks; and

FIG. 10 is an axial section with an alternate assembly of pans and vanes showing an alternate method of supporting the vanes at one end.

Heretofore the method of construction has been to roll and weld a strip of metal to form the outer ring, and likewise form another strip for the inner ring.

The rings were assembled with their vanes extending across the annular space between the rings and this assembly was held in position on a brazing fixture while the assembly was brazed, preferably in a brazing furnace. This procedure required a continuous maintenance of the brazing fixtures since they warp, grow or distort in the furnace, and they must have an accuracy of the order of a few thousandths of an inch. Also, there is danger of the assembly brazing to the fixture. In large production many fixtures are required so that the combined initial cost and maintenance cost is very large and expensive.

In this invention an indirect process is employed, which requires no fixtures thereby eliminating the maintenance cost, and eliminating the hazard of an assembly brazing to the fixture. Referring to the figures of the drawings which represent preferred embodiments of the invention, two cup-shaped pans 10, 12, FIGS. 2 and 3, are made by a pressing process which is cheap and accurate since the material is shaped on or between accurate dies.

The outer pan 10 comprises a generally radially extending bottom 14, with a generally axial extending circular side or rim 16 terminating in a circular lip 18 extending radially outward. The inner pan 12 is a smaller one having a generally flat bottom 20, a circular side or rim 22, and a radially inturned lip 24. This pan is preferably pressed to shape without a lip as shown in broken lines in FIG. 3 and the lip 24 is formed by spinning a part of the rim radially inward.

The rims of the pans subsequently become the shrouds of the stators. The pans each have their cylindrical rims pierced to provide openings 26 and 28 to receive the stator vanes. These openings preferably have the same contour as the vane cross sections so that the vanes are positioned at the selected value of the pitch angle.

The inner pan is located on the outer pan as shown in FIG. 4 by the three pins 30, 31 and 33 slidably carried in block 36 and passing through holes in the pan bottoms. The pins are each of slightly different diameter so that the pans can be positioned in only one way. The holes in the bottoms of the pans have been accurately pierced in proper relation to the vane holes in the pan rims so that the vanes extend properly in the selected general radial direction.

The pans are fixed together by the screws 39 which may be ordinary sheet metal screws extending from a location adjacent the block 36 through the bottom 14 into the lip 24. Thereafter, the pan assembly may be next removed from the pins. The block 36 and pins 30, 31 and 32 and thereafter the screws 39 provide means for mounting the pans in interfitting concentric relation one within the other, with the inner pan 12 opening into or facing into the outer pan 10. The pans 10 and 12 are thus mounted in contiguous relation with the lip 24 of the inner pan contiguous with an annular portion of the inside surface of the bottom 14 of the outer pan. The rims 16 and 22 thus define an annular clearance space 40 therebetween.

Openings 41 (FIG. 1) in the bottom 20 in the inner pan 12 permit the entrance of the brazing atmosphere into the pan interior. Usually this atmosphere is hydrogen.

In the process now being described the vane openings in the outer rim 16 have the full length of the chord of the vane which chord is constant throughout the radial extent of the vane. In the side views of FIGS. 5 and 6 the vanes appear tapered because of their twist even though they are preferably constant in chord length. Each stator blade or vane 42 is pushed radially inward through an outer rim opening 26 into the opening 28 of the inner rim. When all the vanes are inserted they are preferably tack-welded in position at 44 (FIG. 6) at one end on the side of the rim outside the flow passage between the rims. Other means such as mechanical means for instance may also be used to position the vanes radially.

The outer pan 10 has a recess 48 in the bottom 14 so that the heads of the screws 39 do not interfere with the flat portion of the bottom which is to rest on a rack in the furnace. Brazing alloy is then placed at the junction of the vanes 42 and the inner and outer rims.

A group of the vane-pan assemblies of FIG. 5 are then placed on brazing racks 50, as shown in FIG. 8, and introduced into a furnace. The racks 50 may be formed with an outer ring 51 and an inner ring 52 joined by heavy radial members 53 which are welded in place. The supporting surfaces of the rings 51, 52 and the radial members 53 are turned in a lathe to make them accurately flat. Supporting rods 54 may be provided on the sides so that a plurality of the racks 50 may be nested above the other, as shown in FIG. 8.

After the pan assemblies are suitably brazed, the bottoms of the pans are cut away as shown in FIG. 6, so as to provide the desired configuration of the inner and outer stator shrouds. In the instance shown, the outer shroud is a simple circular blank 55 while the inner shroud 56 has a channel cross section.

The lip 18 of the outer pan is incorporated to provide stiffness to the pan rim to keep it circular during the brazing operation. It is removed by machining. The inner pan 12 constitutes stator inner structure which cooperates with the rim of the outer pan 10 to position the inner ends of the vanes 42 relative to their outer ends. The bottom 14 of the outer pan forms a bonding fixture which positions the inner and outer rims and thereby the ends of the vanes.

The finished stator assembly is shown in FIGS. 6 and 7. It provides a general flow passage 57 between the inner and outer shrouds, multi-sected by the vanes 42 which extend from shroud to shroud.

Another method of assembly comprises the steps of inserting the vanes 42 in the openings 28 of the central pan 12 as shown in FIG. 10 before it is located in position by the pins 30, 31 and 32 and the screws 39. This method is particularly useful when the openings in the rim of the outer panel are shorter than the chord lengths of the vanes. The vanes are displaced radially inward sufficiently to permit the central pan and vanes to be positioned inside the outer pan. Next the vanes are moved radially outward to engage the rim of the outer pan.

Preferably, both rims have openings for positioning the vanes. However, the assembly can be executed where only one rim has vane openings. In this process the vanes would require other means of positioning the free ends of the vanes. This could be a tack-weld 60 to position each vane inner end, while it is being brazed to form proper joints with the pan rims.

While the methods herein described, and the form of apparatus for carrying these methods into effect, constitute preferred embodiments of the invention, it is to be understood that the invention is not limited to these precise methods and form of apparatus, and that changes may be made in either without departing from the scope of the invention which is defined in the appended claims.

What is claimed is:

1. The method of fabricating a stator assembly comprising the steps of forming an outer pan with a generally radially extending bottom and a generally axially extending rim, forming an inner pan with a generally radially extending bottom and a generally axially extending rim of smaller diameter than the rim of said outer pan, mounting said pans in interfitting coaxial contiguous relation one within the other with said inner pan opening into said outer pan and defining an annular clearance space between the rims thereof, fixing a plurality of vanes in extending relation between said rims of said pans in said clearance space, furnace bonding said vanes in said rims, and removing the bottoms of each of said pans leaving said pan rims attached to said vanes forming the inner and outer shrouds of said stator assembly.

2. The method of fabricating a stator assembly comprising the steps of forming by pressing an outer pan with a generally radially extending bottom and a generally axially extending annular rim, forming by pressing an inner pan with a generally radially extending bottom and a generally axially extending annular rim of smaller diameter than the rim of said outer pan, mounting said pans in interfitting coaxial fixed relation one within the other with said inner pan opening into said outer pan and defining an annular clearance space between the rims thereof, fixing a plurality of vanes in extending relation between said rims of said pans in said clearance space, furnace bonding said vanes to said rims, and removing the bottom of said outer pan leaving said pan rims attached to said vanes as the inner and outer shrouds of said stator assembly and providing an annular flow passage between said rims through said vanes.

3. The method of fabricating a bladed stator for fluid flow machines comprising the steps of forming an outer pan with a rim, making peripherally spaced holes in the rim to receive stator vanes, forming a central pan with a rim, fixing said central pan centrally to the bottom of said outer pan, placing vanes in said holes, supporting the inner ends of said vanes at the rim of the central pan contiguous thereto, applying brazing material to the junctions between the vanes and said rims, heating the assembled vanes and pans in a brazing furnace, removing the brazed pan assembly, removing the bottom of said outer pan axially opposite said vanes to provide a flow passage between the inner and outer pan rims between the vanes, and machining the rims to provide inner and outer shrouds to selected dimensions.

4. The method of fabricating a bladed stator for fluid flow machines comprising the steps of forming an outer pan with a rim, flanging the rim of said outer pan, making peripherally spaced holes in the rim to receive stator vanes, forming a central pan with a rim, fixing said central pan centrally to the bottom of said outer pan, placing vanes in said holes, supporting the inner ends of said vanes at the rim of the central pan contiguous thereto, applying brazing material to the junctions between the vanes and said rims, heating the assembled vanes and pans in a brazing furnace, removing the brazed pan assembly, removing the bottom of said outer pan axially opposite said vanes to provide a flow passage between the inner and outer rims between the blades, machining the rims to provide inner and outer shrouds to selected dimensions, and removing the flange of said outer pan.

5. The method of fabricating a vaned structure for compressors, turbines and the like, comprising the steps of forming an outer pan having a rim at the open side thereof, forming peripherally spaced holes in the rim thereof to receive stator vanes, forming a central pan having a rim terminating in a lip turned radially inward, forming peripherally spaced vane holes in the axially directed rim of said central pan, fixing said center pan centrally in said outer pan with said holes therein radially opposite corresponding holes in said outer pan, placing a vane in each pair of radially opposite holes in the inner and outer pan rims, applying brazing material to the junctions between the vanes and the outer rim, heating the assembly to accomplish the joining of the parts by fused metal, and removing the bottom of the outer pan axially opposite the vanes to provide a flow passage between the inner and outer rims through between the vanes.

6. The method of fabricating a vaned structure for compressors, turbines and the like, comprising the steps of pressing to form an outer pan having a rim flanged at the open side thereof, forming peripherally spaced holes in the rim thereof to receive stator vanes, pressing to form a central pan having a rim, forming an inwardly turned lip on said central pan rim by spinning, forming peripherally spaced vane holes in the axially directed rim of said central pan, fixing said center pan centrally in said outer pan with said holes therein radially opposite corresponding holes in said outer pan, placing a vane in each pair of radially opposite holes in the inner and outer pan rims, applying brazing material to the junctions between the vanes and the outer rim, heating the assembly to accomplish the joining of the parts by fused metal, removing the bottom of the outer pan axially opposite the vanes to provide a flow passage between the inner and outer rims through between the vanes.

7. The method of fabricating a vaned structure for compressors, turbines and the like, comprising the steps of forming an outer pan having a rim at the open side thereof, forming peripherally spaced holes in the rim thereof to receive stator vanes with said vane holes having a chordwise length as great as the vane chords, forming a central pan having a peripheral rim, forming peripherally spaced vane holes in the axially directed rim of said central pan, fixing said center pan centrally in said outer pan with said holes therein radially opposite corresponding holes in said outer pan, inserting a vane having a constant chord throughout its length in each pair of radially opposite holes in the inner and outer pan rims, applying brazing material to the junctions between the vanes and said rims, heating the assembly to accomplish the joining of the parts by fused metal, removing the bottom of the outer pan axially opposite the vanes to provide a flow passage between the inner and outer rims through between the vanes.

8. A combined stator vane assembly and bonding fixture, comprising an inner pan having a generally radially extending bottom and having a generally axially extending annular rim defining the inner shroud of said stator, an outer pan having a generally radially extending bottom of greater radial extent than said inner pan bottom and having a generally axially extending annular rim defining the outer shroud of said stator assembly, means mounting said pans in fixed interfitting concentric relation one within the other, said bottom of said outer pan being integral with its said rim and being fixed to said inner shroud positioning said inner and outer shrouds relatively to each other, and defining a fixture for positioning said pans and shrouds for bonding, and means in said rims for fixedly positioning a plurality of vanes extending therebetween for the bonding by fused metal of such vanes to said rims.

9. A combined stator vane assembly and bonding fixture for positioning vanes for the bonding by fused metal of a bladed stator without supplementary jigs, comprising an inner pan having a bottom and a generally axially extending annular rim forming an inner stator shroud, terminating in an inwardly turned lip, an outer pan having a generally radially extending bottom and a generally axially extending annular rim forming an outer stator shroud integral with said bottom, with said bottom defining a fixture for positioning said pans for bonding, means mounting said pans in fixed interfitting concentric relation one within the other with the lip of said inner pan contiguous with the inside surface of the bottom of said outer pan, and means in said rims receiving a plurality of vanes extending therebetween for the bonding by fused metal to said rims.

10. A combined stator vane assembly and bonding fixture for the furnace bonding of a bladed stator without supplementary jigs for positioning the vanes in the shrouds, comprising an inner pressed pan having a generally flat bottom and a generally axially extending annular rim and having formed thereon an inwardly turned lip forming an extension of said rim, an outer pressed pan having a generally radially extending bottom and a generally axially extending rim terminating in an outwardly turned annular lip, means mounting said pans in fixed interfitting concentric relation one within the other with the lip of said inner pan contiguous with an annular portion of the bottom of said outer pan, said outer pan bottom forming a fixture for positioning said pans and rims relatively to each other for bonding, and means in said rims defining openings corresponding to the full chord length of the vanes for receiving a plurality of vanes extending therethrough for brazing to said rims in an electric furnace with said lips providing resistance to warping of said pans during the brazing thereof.

11. The method of fabricating a bladed stator for fluid flow machines comprising the steps of forming an outer pan with a rim making peripherally spaced holes in the rim to receive stator vanes, forming a central stator structure with an axially extending rim, fixing said central structure centrally to the bottom of said outer pan, placing vanes in said holes, supporting the inner ends of said vanes at the rim of the central structure rim contiguous thereto, applying brazing material to the junctions between the vanes and said rims, inserting the assembled vanes, pan, and central structure in a brazing furnace and heating to fuse said brazing material at said junctions, removing the pan assembly, removing the bottom of said outer pan axially opposite said vanes to provide a flow passage between said inner and outer rims through the vanes, and machining the rims to provide inner and outer shrouds to selected dimensions.

12. A combined stator vane assembly and bonding fixture, comprising a stator inner structure having a generally axially extending annular inner rim defining an inner shroud of said stator vane assembly, an outer pressed sheet metal pan having a generally radially extending bottom of greater radial extent than said inner rim and having an integral generally axially extending annular rim defining the outer shroud of said stator assembly, means mounting said stator inner structure and said outer pan in fixed concentric relation one within the other, and means in said rims for fixedly positioning a plurality of vanes extending therebetween for bonding by fused metal of such vanes to said rims, said rims being spaced radially to be respectively adjacent the inner and outer ends of said vanes, the bottom of said outer pan defining said bonding fixture and being fixed to said inner structure for positioning said inner and outer shrouds one relative to the other to support opposite ends of said vanes in fixed relation.

References Cited by the Examiner
UNITED STATES PATENTS

| 880,479 | 2/1908 | Buck. |
| 2,691,812 | 10/1954 | Misch _____ 29—156.8 |
| 2,693,677 | 11/1954 | Stalker. |

FOREIGN PATENTS 911,160 10/1962 Great Britain.

JOHN F. CAMPBELL, *Primary Examiner.*

J. D. HOBART, *Assistant Examiner.*